US012731135B2

(12) United States Patent
Nyamwange

(10) Patent No.: US 12,731,135 B2
(45) **Date of Patent: *Sep. 8, 2026**

(54) PROOF OF CACHE USING ARGON2D CRYPTOGRAPHIC HASHING IN PAYMENT PROCESSING

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

(*) Notice: Subject to any disclaimer, the term of this patent is extended or adjusted under 35 U.S.C. 154(b) by 134 days.

This patent is subject to a terminal disclaimer.

(21) Appl. No.: 17/984,497

(22) Filed: Nov. 10, 2022

(65) Prior Publication Data

US 2024/0161102 A1 May 16, 2024

(51) Int. Cl.
*G06Q 20/38* (2012.01)
*G06N 7/01* (2023.01)
*G06Q 20/36* (2012.01)

(52) U.S. Cl.
CPC ........... *G06Q 20/3829* (2013.01); *G06N 7/01* (2023.01); *G06Q 20/363* (2013.01)

(58) Field of Classification Search
CPC ..... G06Q 20/3829; G06Q 20/363; G06N 7/01
See application file for complete search history.

(56) References Cited

U.S. PATENT DOCUMENTS 10,630,769 B2 4/2020 Carver et al.
10,951,675 B2 3/2021 Long et al.
11,398,911 B1 7/2022 Gunning
11,410,233 B2 * 8/2022 Creighton, IV ....... G06Q 40/04
11,438,181 B1 9/2022 Yamada
2018/0121909 A1 * 5/2018 Christidis ............ H04L 9/3236
2019/0220858 A1 7/2019 Weight et al.
2020/0389312 A1 12/2020 Boneh et al.
2021/0281980 A1 9/2021 Xu
2024/0028584 A1 * 1/2024 Huang ............... G06F 16/9024

FOREIGN PATENT DOCUMENTS

CN 109559120 A 4/2019
CN 109886811 A * 6/2019
CN 110457337 A 11/2019
CN 110689343 A 1/2020
CN 112330457 A 2/2021

(Continued)

OTHER PUBLICATIONS

Wikipedia "Argon2", revision as of 07:00, Jun. 6, 2022, https://en.wikipedia.org/w/index.php?title=Argon2&oldid=1091763767. (Year : 2022).*

(Continued)

*Primary Examiner* — Patrick Mcatee
*Assistant Examiner* — Scott Michael Diroma
(74) *Attorney, Agent, or Firm* — Banner & Witcoff, Ltd.

(57) ABSTRACT

Aspects of the disclosure relate to methods, systems, and apparatuses for improving speed of transaction processing in payment systems using a proof of cache system. The proof of cache system may be used to validate transactions using cached keys stored on Directed Acyclic Graph (DAG) nodes that are available. The cached keys may be encrypted using Argon2d cryptographic hashing.

20 Claims, 5 Drawing Sheets

(56) References Cited

FOREIGN PATENT DOCUMENTS

| | | | |
|---|---|---|---|
| CN | 114282189 | A | 4/2022 |
| CN | 114697971 | A | 7/2022 |
| KR | 20200083930 | A | 7/2020 |
| WO | 2023024742 | A1 | 3/2023 |

OTHER PUBLICATIONS

Guo, machine translation of CN109559120A, Apr. 2, 2019. (Year: 2019).*
Chen, machine translation of CN112330457A, Feb. 5, 2021. (Year: 2021).*
English translation of CN_109886811_A (Year: 2019).*

* cited by examiner

PROOF OF CACHE USING ARGON2D CRYPTOGRAPHIC HASHING IN PAYMENT PROCESSING

TECHNICAL FIELD

Aspects of the disclosure are drawn to payment processing using cache consensus methods with Argon2d cryptographic hashing security integration.

BACKGROUND

Organizations and users communicate with one another in different ways using payment processing methods and platforms that are both centralized and decentralized. Payment processing security is fundamental and an important concern is to secure and protect the data and the users or organizations that offer services to the customers. For payment processing methods to be effective and efficient data needs to be encrypted before being sent or received.

Blockchain is perceived as a secure and agnostic feature that integrates with decentralization and distributed computation. When using a blockchain wallet the payment responsibility lies with the user if the digital assets, payments, or token is lost or stolen. Once lost or stolen those digital assets may not be recoverable.

Recent technology achievements in blockchain or other decentralized payments which are based on PoW (Proof or Work), PoS (Proof of Stake), and PoH (Proof of History) consensus through the network hash rates can be very unstable and time consuming. These consensus systems are also vulnerable to side-channel attacks if they are using SHA-256 or SCRIPT cryptograph.

Transactions that involve blockchain using PoW can be slow, time consuming, and vulnerable to attacks. In certain cases, transactions have suffered attacks resulting in networks waiting days or weeks for the next block to be solved or reaching a consensus for a transaction to be completed on time or near real time.

Recent statistics show that hackers stole $600 million in cryptocurrencies due to the slow consensus and cryptography that was used to protect the transactions plus additional transaction costs and concentrations on large mining pools exposing the users to vulnerabilities on public blockchain.

The aforementioned prior art solutions include various drawbacks and shortcomings leaving much room for improvement.

BRIEF SUMMARY

The following presents a simplified summary in order to provide a basic understanding of some aspects of the disclosure. The summary is not an extensive overview of the disclosure. It is neither intended to identify key or essential elements of the disclosure nor to delineate the scope of the disclosure. The following summary merely presents some concepts of the disclosure in a simplified form as a prelude to the description below.

Aspects of the disclosure relate to systems and apparatuses for improving speed of transaction processing using a proof of cache system. The proof of cache system may be used to validate transactions using cached keys stored on Directed Acyclic Graph (DAG) nodes that are available. The cached keys may be encrypted using Argon2d cryptographic hashing.

In accordance with one or more embodiment, a payment processing validation system is provided which includes a key generator, at least one directed acyclic graph node, and a primary node. The key generator generates a unique key for identifiers not found in cache memory and provides the unique key to the at least one directed acyclic graph node. The primary node is in communication with the at least one directed acyclic graph node and validates the transaction if a consensus percentage between the primary node and the at least one directed acyclic graph totals a predetermined threshold.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

The features disclosed herein overcome one or more drawbacks in payment systems to provide a technological improvement. Aspects of the disclosure relate to methods, computer-readable media, and apparatuses for improving speed of transaction processing using a proof of cache system. The proof of cache system may be used to validate transactions using cached keys stored on Directed Acyclic Graph (DAG) nodes that are available.

Figure 1:
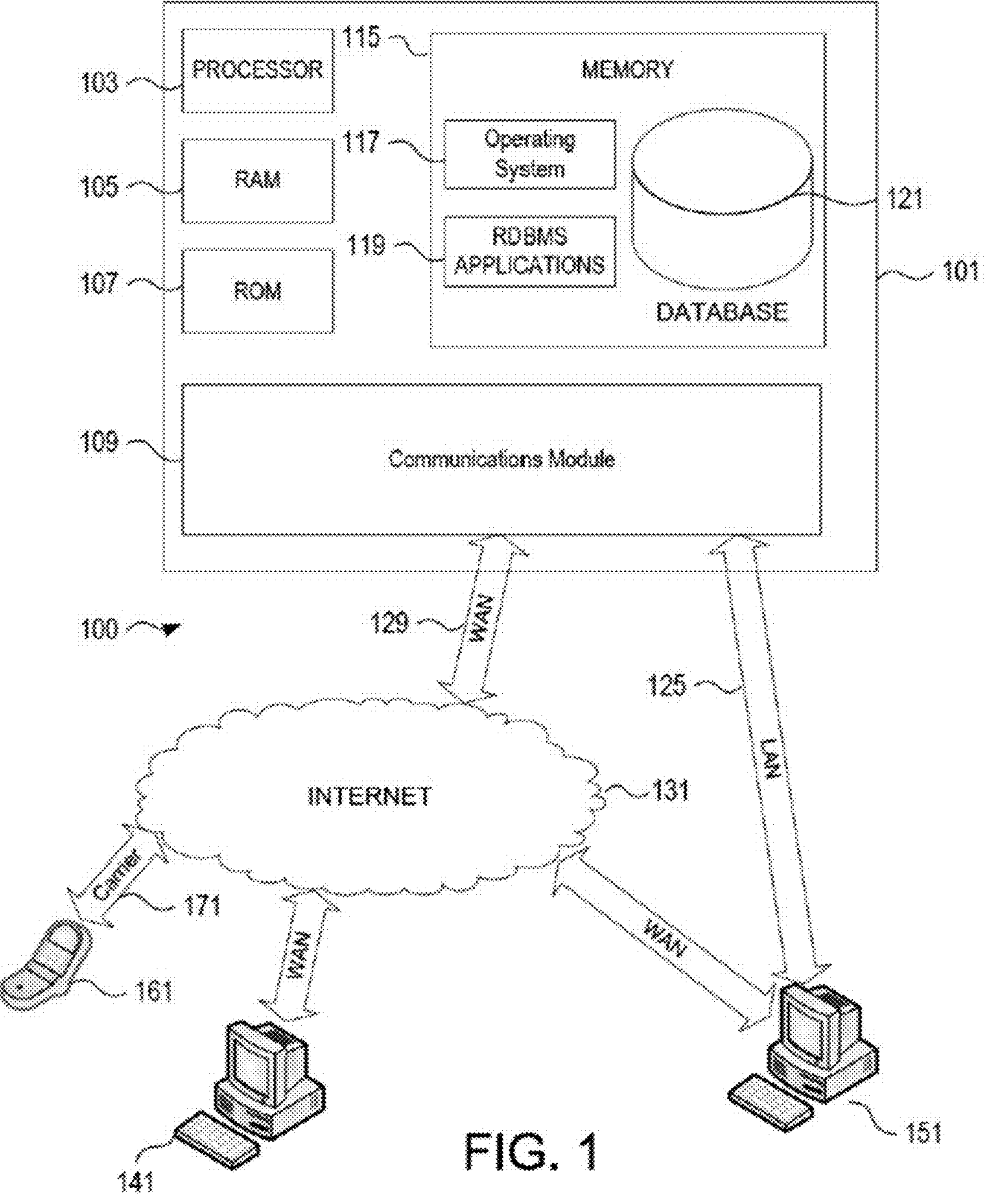
FIG. 1 illustrates an example of a suitable computing system environment that may be used according to one or more illustrative embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 typically includes a variety of computer readable media. Computer readable media may be any available media that may be accessed by computing device 101 and include both volatile and non-volatile media, removable and non-removable media. By way of example, and not limitation, computer readable media may comprise a combination of computer storage media and communication media.

Computer storage media include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts to digital files.

Although not shown, RAM 105 may include one or more applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 125 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and non-volatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
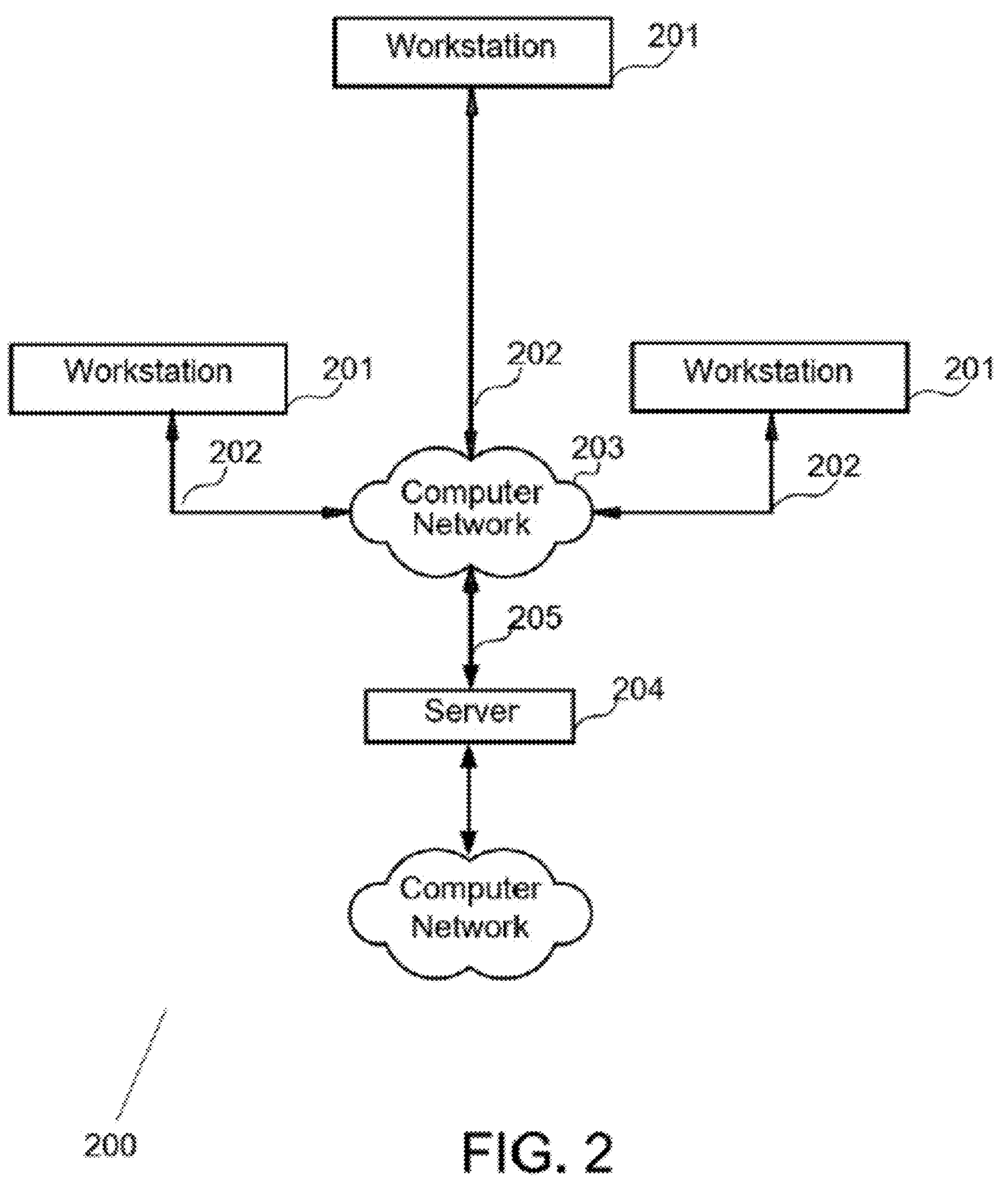
FIG. 2 shows an illustrative system for implementing example embodiments according to the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links.

The steps that follow in the Figures may be implemented by one or more of the components in FIGS. 1 and 2 and/or other components, including other computing devices.

Figure 3:
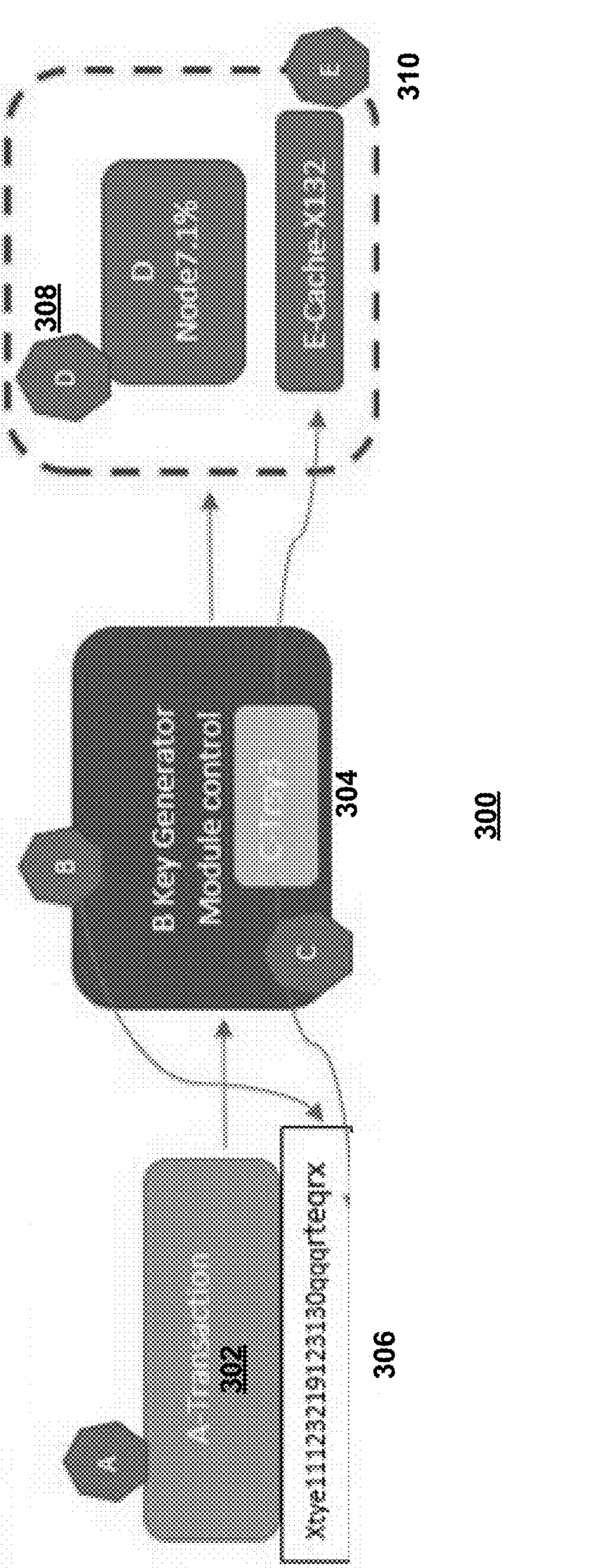
FIG. 3 illustrates a proof of cache system to validate transactions in accordance with an aspect of the disclosure.

FIG. 3 illustrates a proof of cache system 300 to validate transactions. As show in FIG. 3, a new transaction A (302) arrives to be processed at key generator module control (304). In an aspect of the disclosure, the proof of cache system 300 may be used to validate transactions with initial cached keys. The proof of cache system 300 after processing the transaction stores copies of the keys in cache that may have been created during the transactions. In an embodiment, the keys may be stored on the DAG nodes that are available.

Proof of cache system 300 provides a validation pool that may include numerous nodes. In an embodiment, the nodes within a validation pool that have two-thirds or more keys stored in cache are selected from a candidate pool of keys that are already hosted or stored on the cache of majority nodes.

The validation may be selected through a proof of cache method using present keys to validate a transaction. In an embodiment, the initial keys generated may comprise two-thirds of the total number of keys already in cache. One skilled in the art will realize that different percentages of the total number of keys in cache other than two-thirds may be utilized in various embodiments of the disclosure.

Once a new transaction arrives onto a node it may immediately access key generator module control 304, as the transactions may include static and dynamic addresses from a payee or receiver. In an embodiment, key generator module control 304 may create a unique key and binds it to the static and dynamic key 306. Next, the transaction may be passed onto nodes (i.e. Node D 308) which are configured to store a copy of the unique key 310. A consensus may be determined by the shortest path to obtaining a two-thirds majority of the nodes.

In an aspect of the disclosure, the next time the same transaction is initiated, it may be processed through the key generator module control 304 which checks if the address is new or already known. If the address is already known (same as past transaction), the transaction may be tagged with the same unique key that has already been stored in the nodes cache. The pending transaction may be approved by any of the random nodes that have two-thirds majority.

Figure 4:
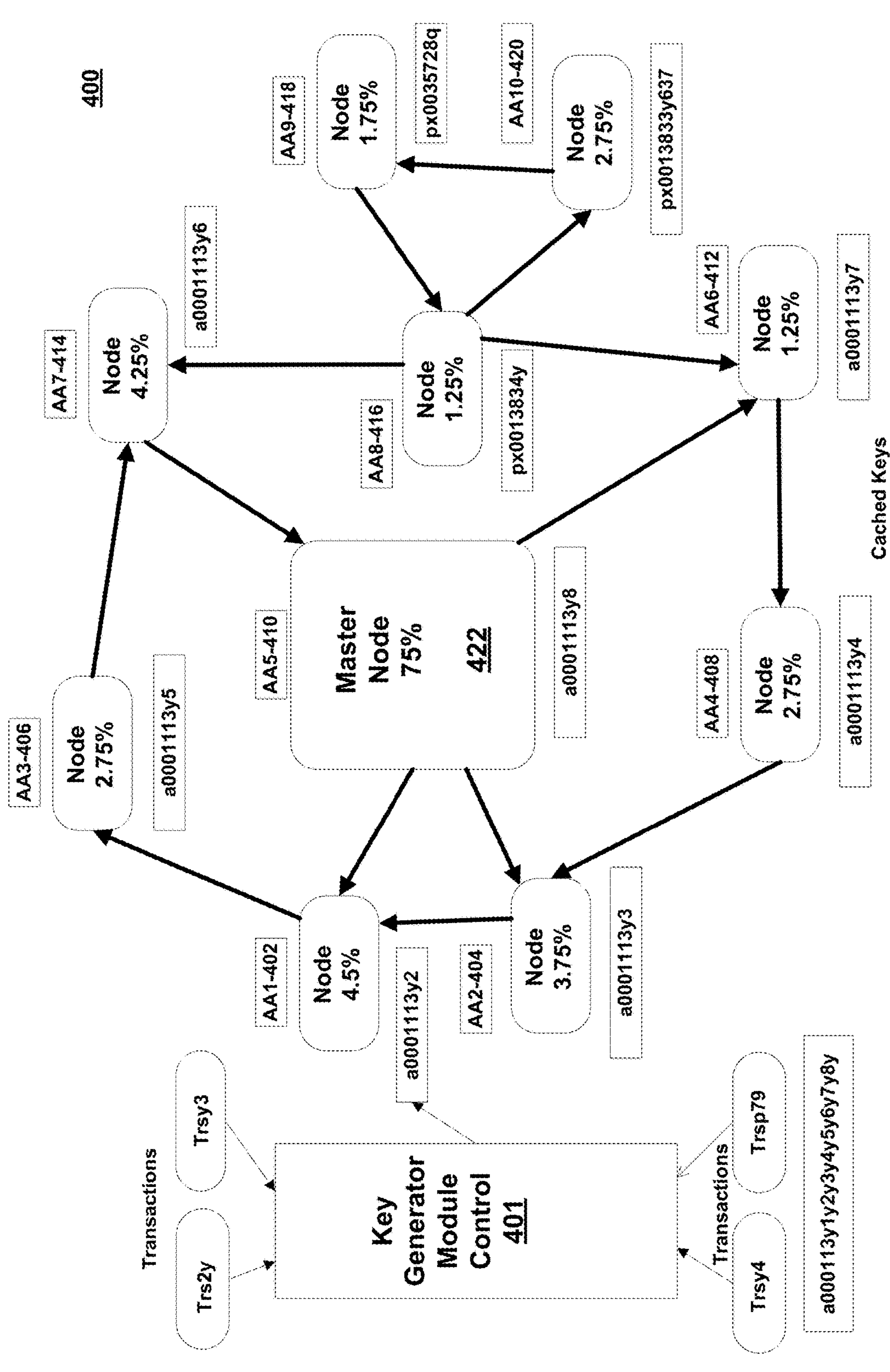
FIG. 4 illustrates a payment processing proof of cache system 400 for validation of transactions in accordance with various aspects of the disclosure.

FIG. 4 illustrates a payment processing proof of cache system 400 for validation of transactions. In FIG. 4, payment processing proof of cache system 400 comprises all listed nodes AA1-402, AA2-404, AA3-406, AA4-408, AA5-410, AA6-412, AA7-414, AA8-416, AA9-418, and AA10-420. Those skilled in the art will realize that any number of nodes may be utilized and are contemplated in payment processing proof of cache system 400.

Based on available computation resources, nodes AA1 (402) through AA10 (420) may be coupled together using a network arrangement that integrates the nodes for: 1) allocation, 2) execution of computational tasks used during payments and processing; 3) validation, and 4) storage of keys in cache memory used for validation once a new transaction is initiated. In an embodiment, the storage may also comprise a block chain ledger.

In another aspect of the disclosure, the allocation cross pairing may be a DAG. In an embodiment, node blocks may be either directly or indirectly related.

Payment processing proof of cache system 400 may be configured to distribute the computation sessions or tasks to the nodes according to the DAG. The nodes may be encoded to track and verify each transaction by validating and approving any new transaction by using a primary node 422. The primary node 422 may identify a majority of the nodes that have cached keys.

In yet another aspect of the disclosure, relationships are maintained and synchronized in real time. If it is determined that a received key is contained in the cache of any of the DAG nodes then that transaction is passed to that DAG node for validation. The pending transaction may be approved by a selection of nodes that have a two-thirds majority. One skilled in the art will realize that different percentages of the total number of keys in cache other than two-thirds may be utilized in various embodiments of the disclosure. In addition, the total consensus percentage of all of the DAG nodes and primary node in the system totals to one hundred percent.

If a new transaction does not meet two-thirds of the nodes for consensus, a new unique key is generated and added to the other cached keys. In an embodiment, the new transaction may be passed onto the nodes for validation by using the shortest path. In future transaction processing, the same transactions by known identifiers may be executed faster and quicker using the proof of cache system 400.

In an aspect of the disclosure, a blockchain ledger is structured to record the execution of the computation tasks associated with the transactions. The blockchain ledger may also be structured to record all events and payments processing status and system resources.

In an embodiment, after a transaction is initiated it must be completed and cannot be cancelled because it follows the DAG requirements for validation and processing.

In another aspect of the disclosure, payment processing proof of cache system 400 includes Argon2d cryptography to prevent GPU cracking attacks. Argon2d provides a stable security feature to the payment processing proof of cache system 400. It may access the memory array in a data dependent order, which reduces the possibility of any attacks during the data transmission and consensus and hence protects the payment for P2P or any other transactions being initiated. Also, cryptography may be optimized to execute on a randomly selected timeframe to improve performance.

The payment processing proof of cache system 400 provides a sufficient degree of randomness regarding the selection of validation nodes and ultimately improves speed of payment consensus and payment processing.

Figure 5:
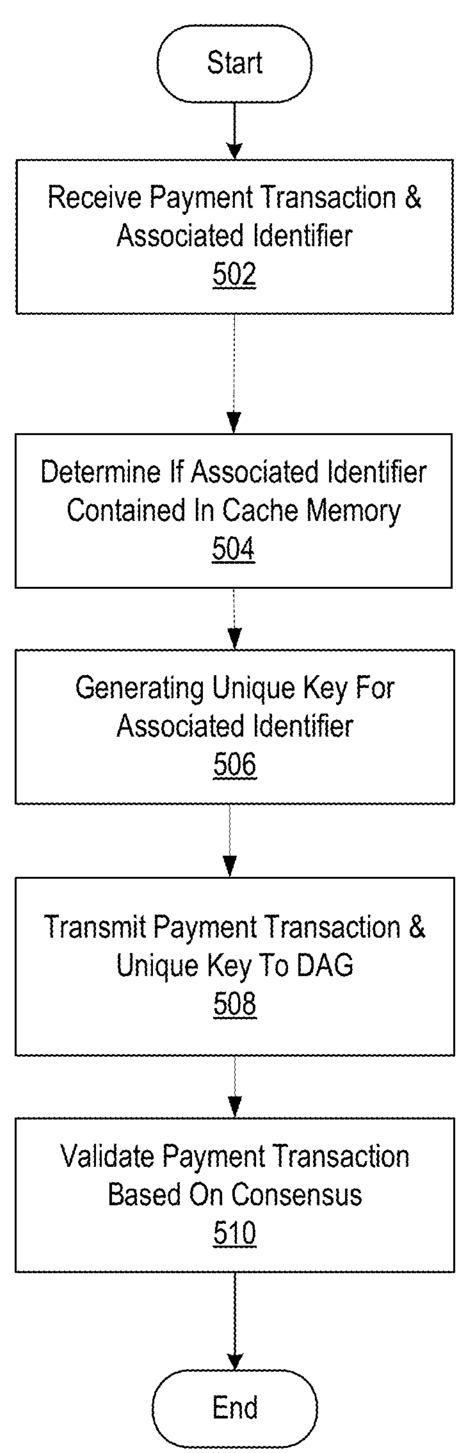
FIG. 5 is flow chart illustrates an example method for payment processing validation according to one or more aspects described herein.

FIG. 5 illustrates an example method for payment processing validation according to one or more aspects described herein. In FIG. 5, at step 502 a payment transaction and associated identifier are received. In step 504, a determination is made as to whether the associated identifier is contained in cache memory. If the associated identifier is not contained in cache memory, in step 506 a unique key is generated for the associated identifier. In an embodiment, this may indicate a new user conducting a first-time transaction or a new account for an existing user. Next, in step 508 the payment transaction and the generated unique key may be transmitted to at least one directed acyclic graph node. In step 510, validation of the payment transaction may be determined by a primary node if a consensus percentage between the primary node and the at least one directed acyclic graph totals to at least a predetermined threshold.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

What is claimed is:

1. A method for processing and validating a payment transaction in a distributed network, the method comprising:

receiving, by a key generator operating on a computing device comprising a processor and random-access memory, a payment transaction and an associated identifier comprising a wallet address associated with an account number;

determining, by the key generator, whether the associated identifier is stored in a cache memory of the key generator maintained in the random-access memory;

generating, by the key generator, a unique key for the associated identifier in response to determining that the associated identifier is not stored in the cache memory of the key generator;

binding, by the key generator, the unique key to a static and dynamic address pair from a payee or receiver included in the payment transaction;

encrypting, by the key generator, the unique key using Argon2d cryptographic hashing configured to access a memory array in a data-dependent order to prevent GPU cracking attacks;

transmitting, by the key generator via a communications module supporting network connections over a local area network and a wide area network, the payment transaction and the encrypted unique key to a plurality of directed acyclic graph (DAG) nodes coupled in a network arrangement;

storing, by each DAG node of the plurality of DAG nodes operating on respective computing devices, the encrypted unique key in a cache memory of the respective DAG node;

receiving, by a primary node in communication with the plurality of DAG nodes via the communications module, the payment transaction and the encrypted unique key from the key generator;

distributing, by the proof of cache system, computational tasks for validating the payment transaction to the plurality of DAG nodes according to a directed acyclic graph structure defining relationships between the plurality of DAG nodes if at least two-thirds of the plurality of DAG nodes contain the encrypted unique key in their respective cache memories;

validating, by the primary node, the payment transaction in response to determining that at least two-thirds of the plurality of DAG nodes contain the encrypted unique key in their respective cache memories;

storing, by the proof of cache system, the encrypted unique key in the cache memory of the primary node;

recording, by the primary node, an execution of the payment transaction, a payment processing status, and system resource usage in a blockchain ledger structured to track computational tasks associated with the payment transaction;

identifying, by the primary node, a shortest path to obtaining a two-thirds majority of the plurality of DAG nodes to achieve the consensus percentage for validating the payment transaction if the consensus percentage does not initially meet the predetermined threshold;

preventing, by the primary node, cancellation of the payment transaction after initiation by enforcing directed acyclic graph requirements for validation and processing;

synchronizing relationships between the plurality of DAG nodes and the primary node in real time to maintain consistency of the encrypted unique key across the cache memories; and executing, by the plurality of DAG nodes, the computational tasks in a distributed computing environment including the processor, the random-access memory, and the communications module.

2. The method of claim 1, the method further comprising:

checking, by the key generator, whether the associated identifier matches an already known address in the cache memory of the key generator upon receiving a subsequent payment transaction via the communications module;

tagging, by the key generator, the subsequent payment transaction with the encrypted unique key previously generated if the associated identifier is found in the cache memory of the key generator; and transmitting, by the key generator, the tagged subsequent payment transaction to the plurality of DAG nodes.

3. The method of claim 2, the method further comprising approving, by the primary node, the subsequent payment transaction when it is determined that the encrypted unique key previously generated is contained in the cache of at least two-thirds of the DAG nodes.

4. The method of claim 3, the method further comprising synchronizing the relationships between the plurality of DAG nodes in real time to maintain consistency of the encrypted unique key across the cache memories of the plurality of DAG nodes and the cache memory of the primary node.

5. The method of claim 4, the method further comprising optimizing, by the proof of cache system, the Argon2d cryptographic hashing by executing the hashing on a randomly selected timeframe to enhance performance of the encrypting step.

6. The method of claim 5, the method further comprising:

identifying, by the primary node, a shortest path among the plurality of DAG nodes to achieve the consensus percentage for validating the payment transaction when the consensus percentage does not initially meet the predetermined threshold;

transmitting, by the primary node, the payment transaction and the encrypted unique key to additional DAG nodes via the shortest path; and updating, by the primary node, the blockchain ledger with a status of the payment transaction reflecting the shortest path validation.

7. The method of claim 6, the method further comprising preventing, by the primary node, cancellation of the payment transaction after initiation by enforcing directed acyclic graph requirements that mandate completion of the computational tasks for validation and processing.

8. The method of claim 7, the method further comprising:

allocating, by the primary node, computational resources among the plurality of DAG nodes for execution of the computational tasks based on available computational resources including processor capacity and memory availability;

monitoring, by the primary node, the execution of the computational tasks by the plurality of DAG nodes to ensure compliance with the directed acyclic graph structure; and adjusting, by the primary node, the allocation of the computational resources dynamically in response to changes in the available computational resources.

9. The method of claim 8, the method further comprising:

maintaining, by the plurality of DAG nodes, the cache memories of the plurality of DAG nodes using a validation pool, wherein the validation pool selects DAG nodes having at least two-thirds of their respective cache memories storing keys matching the encrypted unique key; and communicating, by the plurality of DAG nodes, updates to their respective cache memories to the primary node via the communications module to ensure synchronization.

10. The method of claim 9, the method further comprising:

generating, by the primary node, a validation report detailing the consensus percentage, the execution of the computational tasks, and the payment processing status; and storing, by the primary node, the validation report in the blockchain ledger for auditability.

11. A method for processing and validating a payment transaction in a distributed network, the method comprising:

receiving, by a key generator operating on a computing device comprising a processor and random-access memory, a payment transaction and an associated identifier comprising a wallet address associated with an account number;

determining, by the key generator, whether the associated identifier is stored in a cache memory of the key generator maintained in the random-access memory;

generating, by the key generator, a unique key for the associated identifier in response to determining that the associated identifier is not stored in the cache memory of the key generator;

binding, by the key generator, the unique key to a static and dynamic address pair from a payee or receiver included in the payment transaction;

encrypting, by the key generator, the unique key using Argon2d cryptographic hashing configured to access a memory array in a data-dependent order to prevent GPU cracking attacks;

transmitting, by the key generator via a communications module supporting network connections over a local area network and a wide area network, the payment transaction and the encrypted unique key to a plurality of directed acyclic graph (DAG) nodes coupled in a network arrangement;

storing, by each DAG node of the plurality of DAG nodes operating on respective computing devices, the encrypted unique key in a cache memory of the respective DAG node;

receiving, by a primary node in communication with the plurality of DAG nodes via the communications module, the payment transaction and the encrypted unique key from the key generator;

distributing, by a proof of cache system, computational tasks for validating the payment transaction to the plurality of DAG nodes according to a directed acyclic graph structure defining relationships between the plurality of DAG nodes;

validating, by the primary node, the payment transaction in response to determining that at least two-thirds of the plurality of DAG nodes contain the encrypted unique key in their respective cache memories;

storing, by the primary node, the encrypted unique key in the cache memory of the primary node;

recording, by the primary node, an execution of the payment transaction, a payment processing status, and system resource usage in a blockchain ledger structured to track computational tasks associated with the payment transaction;

executing, by the plurality of DAG nodes, the computational tasks in a distributed computing environment including the processor, the random-access memory, and the communications module;

checking, by the key generator, whether the associated identifier matches a previously known identifier in the cache memory of the key generator upon receiving a subsequent payment transaction via the communications module;

tagging, by the key generator, the subsequent payment transaction with the encrypted unique key previously generated if the associated identifier is found in the cache memory of the key generator;

transmitting, by the key generator, the tagged subsequent payment transaction to the plurality of DAG nodes;

approving, by the primary node, the subsequent payment transaction when it is determined that the encrypted unique key previously generated is contained in the cache of at least two-thirds of the DAG nodes;

synchronizing, by the proof of cache system, the relationships between the plurality of DAG nodes in real time to maintain consistency of the encrypted unique key across the cache memories of the plurality of DAG nodes and the cache memory of the primary node;

optimizing, by the proof of cache system, the Argon2d cryptographic hashing by executing the hashing on a randomly selected timeframe to enhance performance of the encrypting step;

identifying, by the primary node, a shortest path among the plurality of DAG nodes to achieve the consensus percentage for validating the payment transaction when the consensus percentage does not initially meet the predetermined threshold;

transmitting, by the primary node, the payment transaction and the encrypted unique key to additional DAG nodes via the shortest path;

updating, by the primary node, the blockchain ledger with a status of the payment transaction reflecting the shortest path validation;

preventing, by the primary node, cancellation of the payment transaction after initiation by enforcing directed acyclic graph requirements that mandate completion of the computational tasks for validation and processing;

allocating, by the primary node, computational resources among the plurality of DAG nodes for execution of the computational tasks based on available computational resources including processor capacity and memory availability;

monitoring, by the primary node, the execution of the computational tasks by the plurality of DAG nodes to ensure compliance with the directed acyclic graph structure;

adjusting, by the primary node, the allocation of the computational resources dynamically in response to changes in the available computational resources;

maintaining, by the plurality of DAG nodes, the cache memories of the plurality of DAG nodes using a validation pool, wherein the validation pool selects DAG nodes having at least two-thirds of their respective cache memories storing keys matching the encrypted unique key;

communicating, by the plurality of DAG nodes, updates to their respective cache memories to the primary node via the communications module to ensure synchronization;

generating, by the primary node, a validation report detailing the consensus percentage, the execution of the computational tasks, and the payment processing status; and storing, by the primary node, the validation report in the blockchain ledger for auditability.

12. A payment processing validation system for processing and validating a payment transaction in a distributed network, the system comprising:

a key generator implemented on a microprocessor that receives a payment transaction and an associated identifier comprising a wallet address associated with an account number, determines whether the associated identifier is stored in a cache memory of the key generator maintained in random-access memory, generates a unique key for the associated identifier if the associated identifier is not stored, binds the unique key to a static and dynamic address pair from a payee or receiver included in the payment transaction, encrypts the unique key using Argon2d cryptographic hashing configured to access a memory array in a data-dependent order to prevent GPU cracking attacks, and transmits the payment transaction and the encrypted unique key via a communications module;

a plurality of directed acyclic graph (DAG) nodes coupled in a network arrangement that receive the payment transaction and the encrypted unique key from the key generator via the communications module, store the encrypted unique key in a cache memory of each respective DAG node, and execute computational tasks for validating the payment transaction in a distributed computing environment;

a primary node in communication with the plurality of DAG nodes via the communications module that receives the payment transaction and the encrypted unique key from the key generator, distributes, via the payment processing validation system, the computational tasks to the plurality of DAG nodes according to a directed acyclic graph structure defining relationships between the plurality of DAG nodes, validates the payment transaction in response to determining that at least two-thirds of the plurality of DAG nodes contain the encrypted unique key in their respective cache memories, stores the encrypted unique key in the cache memory of the primary node, records an execution of the payment transaction, a payment processing status, and system resource usage in a blockchain ledger structured to track the computational tasks, identifies a shortest path to obtaining a two-thirds majority of the plurality of DAG nodes to achieve the consensus percentage for validating the payment transaction if the consensus percentage does not initially meet the predetermined threshold, prevents cancellation of the payment transaction after initiation by enforcing directed acyclic graph requirements for validation and processing, and synchronizes relationships between the plurality of DAG nodes and the primary node in real time to maintain consistency of the encrypted unique key across the cache memories; and the communications module supporting network connections over a local area network and a wide area network that facilitates transmission of the payment transaction and the encrypted unique key between the key generator, the plurality of DAG nodes, and the primary node.

13. The payment processing validation system of claim 12, wherein the key generator further checks whether the associated identifier matches a previously known identifier in the cache memory of the key generator upon receiving a subsequent payment transaction, tags the subsequent payment transaction with the encrypted unique key previously generated if the associated identifier is found, and transmits the tagged subsequent payment transaction to the plurality of DAG nodes.

14. The payment processing validation system of claim 13, wherein the primary node approves the subsequent payment transaction when it is determined that the encrypted unique key previously generated is contained in the cache of at least two-thirds of the DAG nodes.

15. The payment processing validation system of claim 14, wherein the payment processing validation system further synchronizes the relationships between the plurality of DAG nodes in real time to maintain consistency of the encrypted unique key across the cache memories of the plurality of DAG nodes and the cache memory of the primary node.

16. The payment processing validation system of claim 15, wherein the payment processing validation system further optimizes the Argon2d cryptographic hashing by executing the hashing on a randomly selected timeframe to enhance performance of encryption by the key generator.

17. The payment processing validation system of claim 16, wherein the primary node further identifies a shortest path among the plurality of DAG nodes to achieve the consensus percentage when the consensus percentage does not initially meet the predetermined threshold, transmits the payment transaction and the encrypted unique key to additional DAG nodes via the shortest path, and updates the blockchain ledger with a status of the payment transaction reflecting the shortest path validation.

18. The payment processing validation system of claim 17, wherein the primary node further prevents cancellation of the payment transaction after initiation by enforcing directed acyclic graph requirements that mandate completion of the computational tasks for validation and processing.

19. The payment processing validation system of claim 18, wherein the primary node further allocates computational resources among the plurality of DAG nodes for execution of the computational tasks based on available computational resources including processor capacity and memory availability, monitors the execution of the computational tasks to ensure compliance with the directed acyclic graph structure, and adjusts the allocation of the computational resources dynamically in response to changes in the available computational resources.

20. The payment processing validation system of claim 19, wherein:

the key generator implemented on a microprocessor operates on a computing device comprising a processor and the random-access memory, receives the payment transaction and the associated identifier via the communications module, determines whether the associated identifier is stored in the cache memory of the key generator, generates the unique key for the associated identifier if not stored, binds the unique key to the static and dynamic address pair from the payee or receiver, encrypts the unique key using the Argon2d cryptographic hashing, checks whether the associated identifier matches a previously known identifier in the cache memory of the key generator upon receiving a subsequent payment transaction, tags the subsequent payment transaction with the encrypted unique key if the associated identifier is found, and transmits the payment transaction, the encrypted unique key, and the tagged subsequent payment transaction to the plurality of DAG nodes via the communications module supporting network connections over the local area network and the wide area network;

the plurality of DAG nodes operates on respective computing devices, receives the payment transaction and the encrypted unique key, stores the encrypted unique key in the cache memory of each respective DAG node, executes the computational tasks in the distributed computing environment including the processor and the random-access memory, maintains the cache memories of the plurality of DAG nodes using a validation pool selecting DAG nodes having at least two-thirds of their respective cache memories storing keys matching the encrypted unique key, and communicates updates to their respective cache memories to the primary node via the communications module;

the primary node approves the subsequent payment transaction when it is determined that the encrypted unique key previously generated is contained in the cache of at least two-thirds of the DAG nodes, receives the payment transaction and the encrypted unique key, distributes, via the payment processing validation system, the computational tasks according to the directed acyclic graph structure, validates the payment transaction in response to determining that at least two-thirds of the plurality of DAG nodes contain the encrypted unique key in their respective cache memories, stores the encrypted unique key in the cache memory of the primary node, records the execution, the payment processing status, and the system resource usage in the blockchain ledger, synchronizes, via the payment processing validation system, the relationships between the plurality of DAG nodes in real time, optimizes, via the payment processing validation system, the Argon2d cryptographic hashing on the randomly selected timeframe, identifies the shortest path when the consensus percentage is insufficient, transmits the payment transaction and the encrypted unique key via the shortest path, updates the blockchain ledger with the shortest path validation status, prevents cancellation by enforcing the directed acyclic graph requirements, allocates the computational resources based on the available computational resources, monitors the execution for compliance, adjusts the allocation dynamically, generates a validation report detailing the consensus percentage, the execution of the computational tasks, and the payment processing status, and stores the validation report in the blockchain ledger for auditability; and the communications module comprising a network interface facilitates transmissions between the key generator, the plurality of DAG nodes, and the primary node over the local area network and the wide area network.

* * * * *